July 31, 1928.

M. H. MASSUERE

ATTACHMENT FOR HYDRAULIC BRAKE SYSTEMS

Filed March 5, 1927

1,678,677

Inventor

Mark H. Massuere by Wilkinson & Giusta

Attorneys.

Patented July 31, 1928.

1,678,677

UNITED STATES PATENT OFFICE.

MARK H. MASSUERE, OF HOLLYWOOD, CALIFORNIA.

ATTACHMENT FOR HYDRAULIC BRAKE SYSTEMS.

Application filed March 5, 1927. Serial No. 173,188.

The present invention relates to improvements in attachments for hydraulic brake systems and has for an object to provide an attachment or accessory interposed between the master brake cylinder and the supply tank for controlling the supply of the liquid or fluid to the master brake cylinder and to the system of brake pipes.

It is an object of the present invention to provide a device that will automatically keep the systems supplied with fluid, but at the same time will avoid the disastrous consequences of interfering with the brake action.

A further object of the invention is to provide a simple, compact and inexpensive device, constructed in the nature of an attachment which can be readily inserted in the pipe line between the supply tank and master cylinder without in any way involving a modification or alteration of the existing constructions.

With the foregoing and other objects in view, the invention will be more fully described hereinafter, and will be more particularly pointed out in the claims appended hereto.

In the drawings, wherein like symbols refer to like or corresponding parts through the several views, Figure 1 is a diagrammatic plan view of a vehicle shown with the invention;

Figure 1:
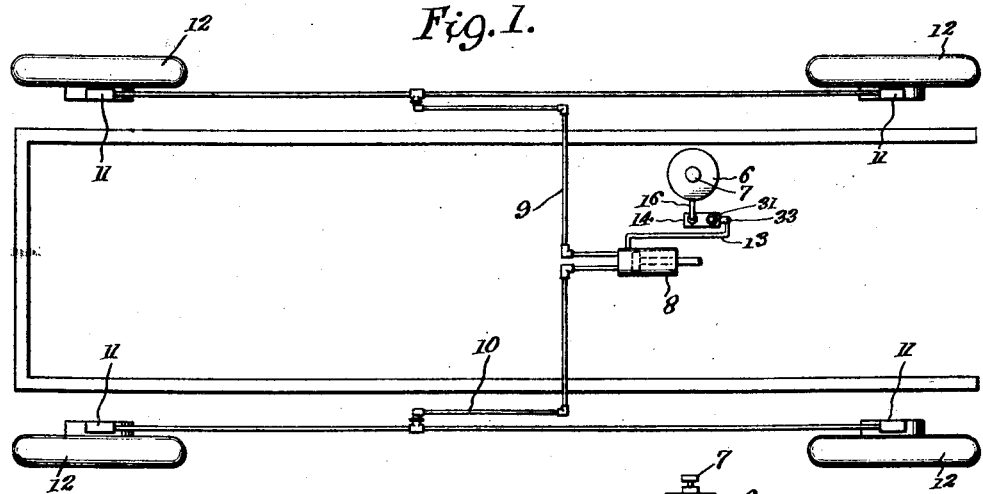
Figure 2:
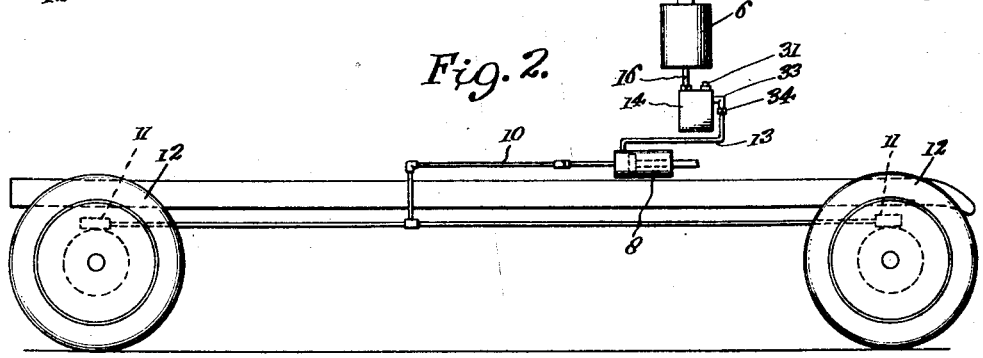
Figure 2 is a side view of the same.
Figure 3:
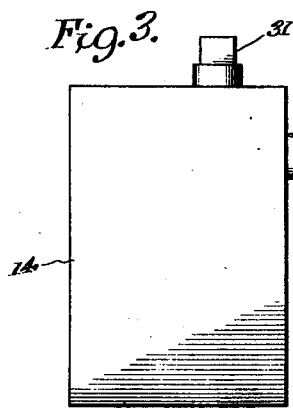
Figure 3 is an enlarged front elevation of the improved attachment.
Figure 4:
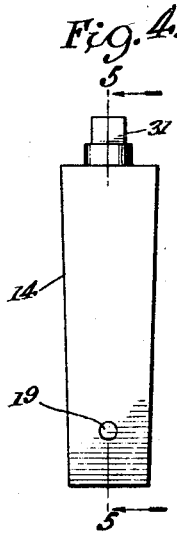
Figure 4 is an edge view of the improved attachment.
Figure 5:
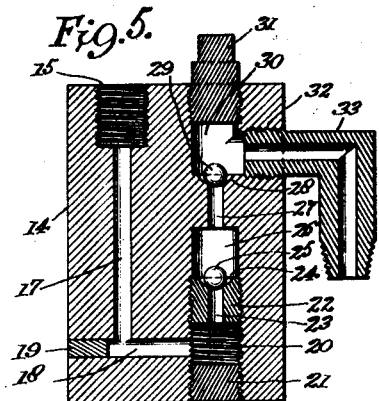
Figure 5 is a vertical section taken on the line 5—5 in Figure 4.

Referring more particularly to the drawings, 6 designates the supply tank having the ordinary screw valve indicated at 7 to control the outlet of the fluid to the master cylinder, which is indicated at 8. The pipe lines are indicated at 9 and 10, connecting with the master cylinder 8 and with the brake cylinders 11 at the wheels 12 of the vehicle. At 13 is represented the pipe line between the supply tank 6 and the master cylinder 8, and it is the purpose of the present invention to add an accessory regulator in this pipe line 13.

This accessory regulator is embodied in a block or casing 14, having a threaded socket 15 opening through its upper portion at one side for receiving the fitment or pipe section 16, which extends down immediately from the supply tank 6. This threaded socket 15 is directly above a vertical duct 17 which communicates at its lower end with a lateral duct 18, closed at one end by the removable plug 19 and opening at its other end into a threaded socket 20. This threaded socket is closed by the removable threaded plug 21, and is adapted to receive the externally threaded collar 22, having the longitudinal bore 23 and the valve seat 24 in its upper edge. This valve seat may be constituted of a concavity or depression in the upper surface of the member 22 to receive thereagainst the ball check valve 25, which simply floats upon the upper end of the member 22 and is confined otherwise within a valve chamber 26 formed above the threaded socket 20 and, in effect, a continuation of the same. Above the valve chamber 26 is a passage 27 of smaller diameter, at the upper end of which is formed a concavity or valve seat 28 for the ball check valve 29. This ball check valve also floats upon the seat 28 and both valves are adapted to close by the action of gravity and pressure in the brake cylinder and brake system. The upper check valve 29 is movably mounted in the upper valve chamber 30, the upper end of which is closed by the air drain plug 31, preferably externally threaded for the purpose of ready removal and having a wrench shank, or a peculiarly formed shank to receive a tool by which the plug may be disengaged from the threaded upper portion of the valve chamber 30, which opens out upon the top of the block 14.

The upper valve chamber 30 is also provided with a lateral branch 32 having a threaded wall to engage with the threads upon the horizontal arm of an elbow connection 33. The vertical arm of this connection extends down and is united as by a coupling 34 or the like with the pipe line 13 extending to the master cylinder 8.

In operation, the fluid descends from the supply tank 6 by the action of gravity and passes entirely through the valve block 14 by the same action, thus automatically passing to the master cylinder 8 and to the system of brake pipes connected therewith, in order to supply any deficiency in fluid occurring at any time from leakage or other causes. It will be understood that when the improved accessory is in place, the ordinary screw valve 7 in the supply tank will be left open and the necessity will no longer be felt for periodically and manually opening this screw valve 7, in order to permit the fluid to descend into the impoverished system. The fluid will pass through the fitment 16 down through the duct 17 and laterally through the duct 18 to the socket 20. Thence, it will be compelled to rise through the two valve chambers in succession, opening automatically in sequence the check valves 25 and 29, and finally finding its way out through the elbow connection 23, and out through the pipe line 13 by which it is conveyed to the master cylinder 8. Both check valves are gravity operated and are normally in the closed position, so that any pressure in the brake line is checked at these valves; and, if for any reason the upper valve 29 should fail to seat completely, the leaking pressure will be effectually arrested at the lower valve 25. Both valves make the leakage substantially impracticable and are safety factors balancing and checking the action of one another.

It will be noted that both valve chambers are located below the source of supply in the tank 6, and that the master cylinder 8 is below the system of valve chambers, so that there will be a substantial column of fluid, the static weight of which will automatically open the valves upwardly whenever a partial vacuum exists in the brake system, caused by the leakage of fluid or through other causes. In other words, the device is intended to constantly keep the brake system supplied with ample fluid for its needs, and the amount of fluid may be regulated to a large extent by the degree of opening of the screw valve 7, the size of the valves 25, 29, and the valve chambers, etc. When the pressure in the brake lines normally remains at that of the atmosphere, that is, with no pedal pressure applied, the check valves remain closed; but when the pressure in the lines falls below atmospheric pressure, the valves immediately open and allow the fluid to flow into the line, until the pressure is again at atmospheric pressure.

The ball check valves are entirely automatic in action; they are normally closed, yet sufficiently delicate in operation so that air positively cannot enter the brake lines under normal operating conditions, because no vacuum is allowed to form. Vacuum within the lines eventually draws air in the lines. The device does away with the troublesome method of supplying fluid by a pump. Should air be admitted to the lines by disconnecting them, this air can be drained out through the air drain plug 31, and this plug is placed at a strategic point, inasmuch as the air will always ascend to the highest point. It will be noted that the valve chamber 30 is also at the highest point of the system, and that this valve chamber is of substantial capacity whereby to hold accumulated air until the plug 31 is removed.

The present device, by always keeping the brake lines full of fluid, permits the brakes to operate at maximum efficiency at all times, and thus increases the factor of safety of such devices.

It will be obvious that many changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. A fluid braking system replenishing attachment to be interposed between the source of fluid supply and the brake system including a body having a continuous passage for the conduct of the replenishing fluid, such passage being formed of substantially U-shape, companion check valves disposed in the rising leg of the U-shaped passage, one above another and opening freely upward and automatically closing downward, a large valve chamber above the upper check valve, and an air drain means for said valve chamber.

2. A fluid brake system attachment comprising a block having extending therethrough a substantially U-shaped continuous passage for the replenishing fluid, one leg of said U-shaped passage having valve seats therein, check valves for closing downwardly against said seats, a valve chamber above the upper valve adapted to have communication with the system for receiving an accumulation of air, and means carried by said block for evacuating the air from said valve chamber.

3. A fluid brake system attachment including a valve block having a through passage, companion valves in said passage adapted to close toward the supply tank and open toward the brake system, a chamber in said block for the accumulation of air in the brake system, said chamber being located between the valves and the brake system, and means for venting the accumulated air from said chamber.

4. A brake system attachment including a supply tank and a pipe connection from the through passage arranged to communicate with a fluid reservoir, said passage comprising a down duct, a lateral duct, an uptake including a pair of valve chambers having seats in the lower portion thereof, and ball check valves adapted to close downwardly against said seat.

5. A brake system attachment including a valve block having a socket in its upper portion for communication with a fluid reservoir, a down-take duct communicating with the socket, a lateral duct communicating with the down-take duct, an up-take communicating with the lateral duct, a socket in the lower portion of said up-take, an adjustably mounted perforated valve seat in said socket, removable means for closing said socket, a valve chamber above said valve seat, a second valve chamber in the upper portion of the up-take having a perforated valve seat in its lower portion, ball check valves floating upon said seats, removable means for closing the upper valve chamber, and a lateral connection to said upper valve chamber for communication with the master cylinder of a brake system.

MARK H. MASSUERE.